US009266518B2

(12) United States Patent
Fraser-Chanpong et al.

(10) Patent No.: US 9,266,518 B2
(45) Date of Patent: Feb. 23, 2016

(54) COMPONENT CONTROL SYSTEM FOR A VEHICLE

(71) Applicants:GM GLOBAL TECHNOLOGY OPERATIONS LLC, Detroit, MI (US); The United States of America as Represented by the Administrator of the National Aeronautics and Space Administration, Washington, DC (US)

(72) Inventors: Nathan Fraser-Chanpong, Houston, TX (US); Ivan Spain, Pearland, TX (US); Andrew D. Dawson, League City, TX (US); William J. Bluethmann, Houston, TX (US); Chunhao J. Lee, Troy, MI (US); Robert L. Vitale, Macomb Township, MI (US); Raymond Guo, Seabrook, TX (US); Thomas M. Waligora, Houston, TX (US); Akinjide Akinniyi Akinyode, Houston, TX (US); Ryan M. Reed, Houston, TX (US)

(73) Assignees: GM Global Technology Operations LLC, Detroit, MI (US); The United States of America As Represented by the Administrator of the National Aeronautics and Space Administration, Washington, DC (US)

( * ) Notice: Subject to any disclaimer, the term of this patent is extended or adjusted under 35 U.S.C. 154(b) by 56 days.

(21) Appl. No.: 14/075,290

(22) Filed: Nov. 8, 2013

(65) Prior Publication Data

US 2015/0134199 A1 May 14, 2015

(51) Int. Cl.
*G05B 11/01* (2006.01)
*B60K 8/00* (2006.01)
*B60W 10/00* (2006.01)
*B60W 10/20* (2006.01)
*B60W 10/18* (2012.01)
*B60W 10/04* (2006.01)

(52) U.S. Cl.
CPC ............... *B60W 10/00* (2013.01); *B60W 10/04* (2013.01); *B60W 10/18* (2013.01); *B60W 10/20* (2013.01)

(58) Field of Classification Search
USPC ............. 701/20–100; 713/1–50; 700/50–100; 180/50–100
See application file for complete search history.

(56) References Cited

U.S. PATENT DOCUMENTS

| 6,226,569 | B1* | 5/2001 | Peter | B62D 15/02 318/587 |
| 6,804,564 | B2* | 10/2004 | Crispin | B60K 41/004 123/406.13 |
| 7,886,137 | B1* | 2/2011 | Righi | G06F 9/4446 713/1 |
| 8,099,179 | B2* | 1/2012 | Naik | G05B 9/03 180/65.225 |

(Continued)

*Primary Examiner* — Rami Khatib
*Assistant Examiner* — Timothy Nesley
(74) *Attorney, Agent, or Firm* — Quinn Law Group, PLLC

(57) ABSTRACT

A vehicle includes a chassis, a modular component, and a central operating system. The modular component is supported by the chassis. The central operating system includes a component control system, a primary master controller, and a secondary master controller. The component control system is configured for controlling the modular component. The primary and secondary master controllers are in operative communication with the component control system. The primary and secondary master controllers are configured to simultaneously transmit commands to the component control system. The component control system is configured to accept commands from the secondary master controller only when a fault occurs in the primary master controller.

20 Claims, 6 Drawing Sheets

(56) References Cited

U.S. PATENT DOCUMENTS

| | | | |
|---|---|---|---|
| 8,220,038 B1* | 7/2012 | Lucchesi et al. | 726/9 |
| 2002/0165649 A1* | 11/2002 | Wilhelm Rekow | A01B 69/008 701/26 |
| 2003/0047362 A1* | 3/2003 | Chernoff | B60G 3/18 180/65.245 |
| 2006/0116803 A1* | 6/2006 | Armbruster | G05B 9/03 701/48 |
| 2006/0122741 A1* | 6/2006 | Bassiere | G06F 9/4806 701/1 |
| 2010/0222968 A1* | 9/2010 | Kifuku | H02P 29/02 701/42 |
| 2012/0229056 A1* | 9/2012 | Bergfjord | B60L 11/1851 318/139 |
| 2013/0245857 A1* | 9/2013 | Gariepy | G05B 19/0428 701/2 |
| 2013/0282249 A1* | 10/2013 | Heise | B60T 7/042 701/70 |
| 2015/0005990 A1* | 1/2015 | Burns | B64D 31/14 701/3 |

* cited by examiner

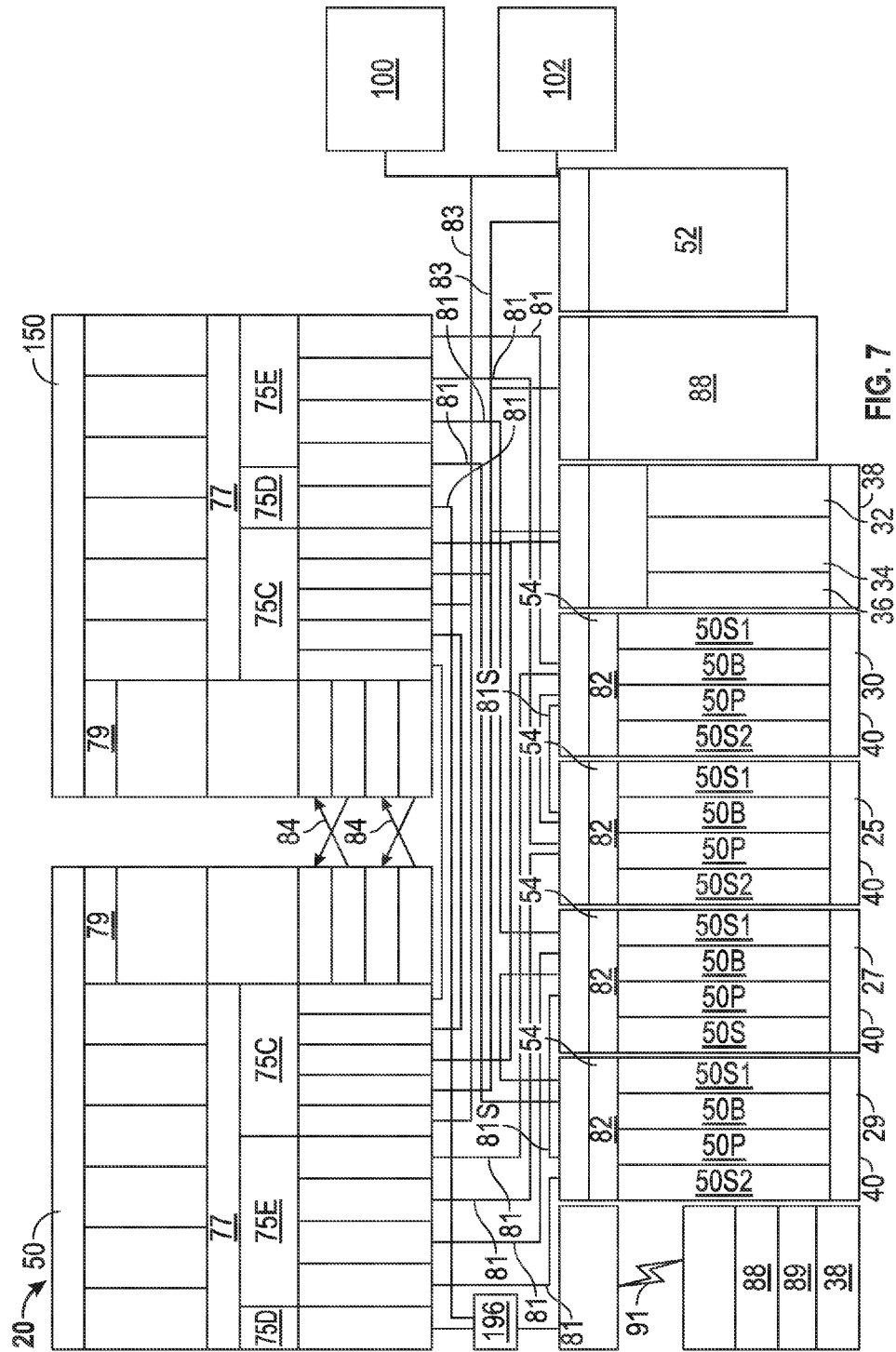

COMPONENT CONTROL SYSTEM FOR A VEHICLE

STATEMENT REGARDING FEDERALLY SPONSORED RESEARCH OR DEVELOPMENT

This invention was made with government support under NASA Space Act Agreement number SAA-EA-10-017. The invention described herein may be manufactured and used by or for the U.S. Government for U.S. Government (i.e., non-commercial) purposes without the payment of royalties thereon or therefor.

TECHNICAL FIELD

The present disclosure is related to a component control system for a vehicle.

BACKGROUND

An ideal vehicle design for a driver who is commuting within a congested area might be a relatively small, fuel efficient vehicle that is easy to maneuver and park. However, on other occasions, the same driver may wish to transport multiple passengers and/or cargo, or may wish to operate in different drive modes. For such a driver, a conventional vehicle chassis and powertrain, having a fixed configuration and mechanically coupled steering, braking, and propulsion systems, may be less than optimal.

SUMMARY

A modular robotic vehicle is disclosed herein. The vehicle is electrically driven, via by-wire commands, using energy from a high-voltage battery pack and an associated power electronics module. The vehicle is controlled by way of a distributed control network having a primary and secondary master controller and multiple embedded control modules, with each control module having a corresponding steering, propulsion, and braking control task for a given corner of the vehicle. Multiple levels of control redundancy are provided, e.g., with multiple control modules used to ensure a "fail safe" backup for operationally critical functions.

Additionally, each corner of the vehicle includes a modular, self-contained "eModule", housing electric steering, propulsion, braking, and suspension subsystems. Independent control of each eModule is supervised by the primary and secondary master controllers, with the various control modules embedded within the eModules communicating as needed with the master controller via Ethernet for Control Automation Technology (EtherCAT) or another suitable high-speed connection.

Driver input commands are received by the master controller from various devices, such as a steering wheel and/or joystick, a brake pedal, an accelerator pedal, and a human machine interface (HMI) screen or touchpad. These electrical input signals are transmitted to the primary and secondary master controllers. The primary and secondary master controllers then issue individual commands to each of the control modules embedded within the eModules that are affected by the driver inputs. The entire control operation is by-wire as noted above, i.e., lacking a direct mechanical linkage between the driver input devices and the steering, propulsion, or braking subsystems being controlled in response to the driver's inputs.

In one possible aspect of the disclosure, a central operating system includes a component control system, a primary master controller, and a secondary master controller. The component control system is configured for controlling a modular component. The primary master controller and the secondary master controller are in operative communication with the component control system. The primary master controller and the secondary master controller are configured to simultaneously transmit commands to the component control system. The component control system is configured to accept commands from the secondary master controller only when a fault occurs in the primary master controller.

In another possible aspect of the disclosure, a vehicle includes a chassis, a modular component, and a central operating system. The modular component is supported by the chassis. The central operating system includes a component control system, a primary master controller, and a secondary master controller. The component control system is configured for controlling the modular component. The primary and secondary master controllers are in operative communication with the component control system. The primary and secondary master controllers are configured to simultaneously transmit commands to the component control system. The component control system is configured to accept commands from the secondary master controller only when a fault occurs in the primary master controller.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 7 is a schematic diagrammatic view of the functional hardware interface of the controllers of the vehicle.

DETAILED DESCRIPTION

Figure 1:
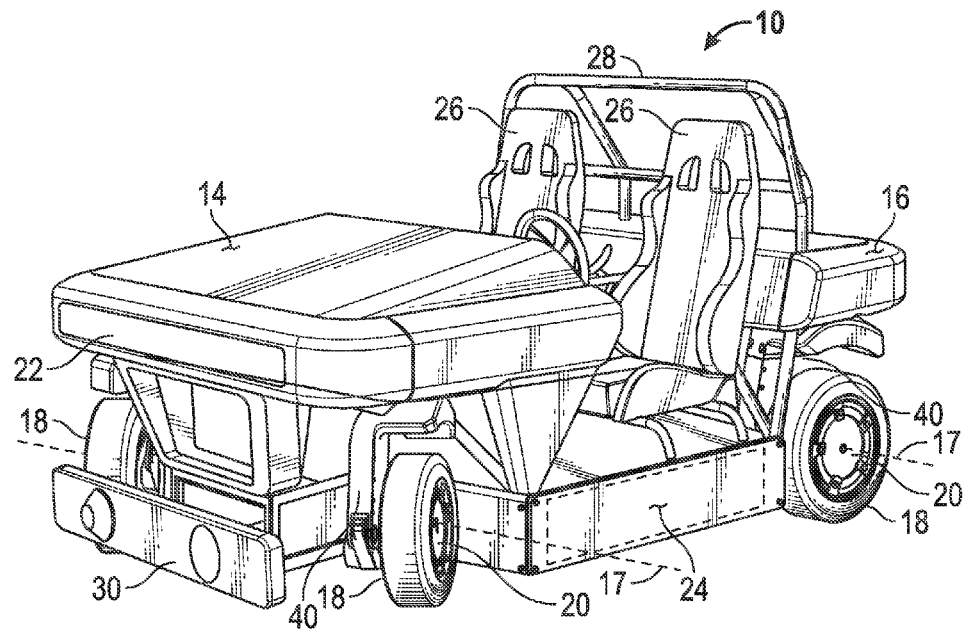
FIG. 1 is a schematic perspective side view illustration of an example modular robotic vehicle.
Figure 2:
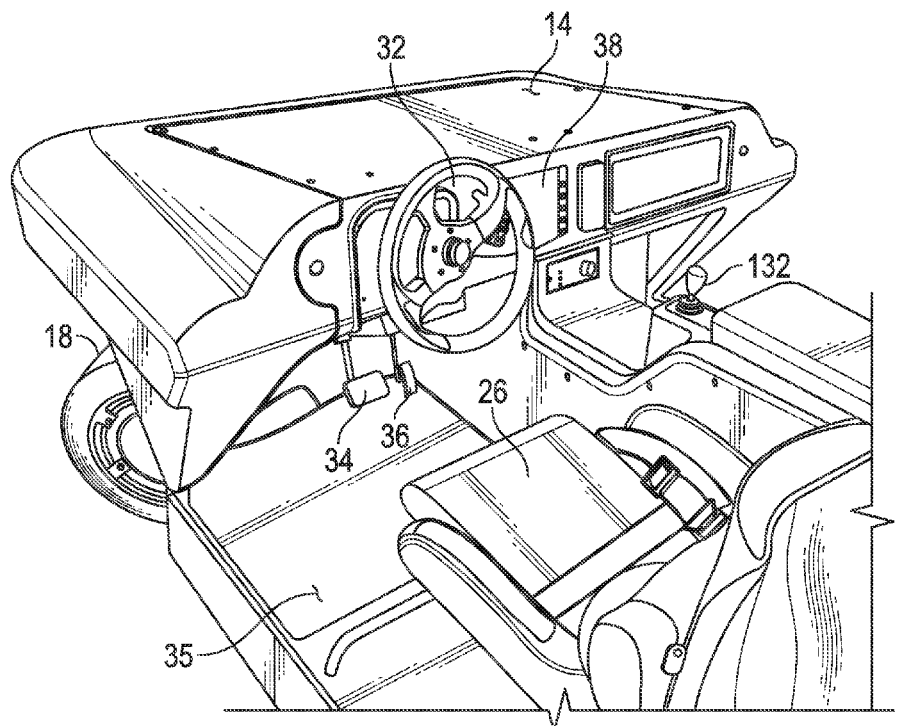
FIG. 2 is a schematic perspective top view illustration of the vehicle shown in FIG. 1.
Figure 3:
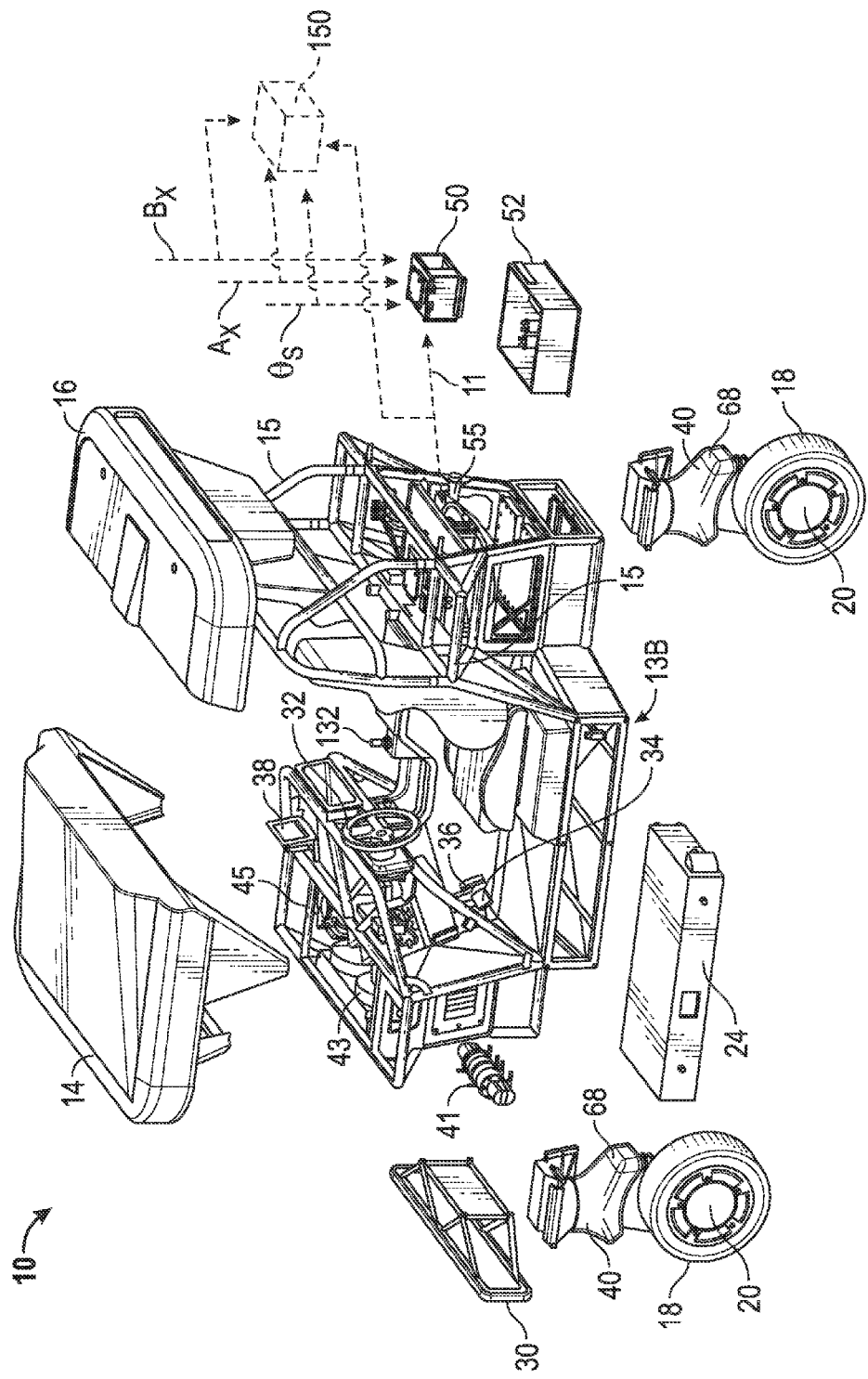
FIG. 3 is a schematic exploded view illustration of the vehicle shown in FIGS. 1 and 2.

Referring to the drawings, wherein like reference numbers refer to like components throughout the several Figures, an example modular robotic vehicle 10 is shown schematically in FIGS. 1-3. The term "modular" as used herein refers to the modularity of design of the vehicle 10 as a whole, i.e., with the vehicle 10 being divided into multiple independently and/or interdependently controlled electromechanical subsystems or modular components, each of which can be disconnected from or connected, to the vehicle 10 as needed to establish a desired functional drive configuration.

A particular modular component providing a foundation to the design set forth herein is a self-contained electric corner assembly or "eModule" 40, with a first 25, second 27, third 29, and fourth 30 eModule 40. By way of a non-limiting example, the vehicle 10 may have one eModule 40 being positioned at each corner of the vehicle 10, i.e., a left front (LF) 25, a right front (RF) 27, a left rear (LR) 29, and a right rear (RR) 30 of the vehicle 10. Each eModule 40 includes a drive wheel 18. A typical four-wheel design as shown in FIG. 1 has four eModules 40. However, it should be appreciated that the vehicle 10 may have more or less eModules 40 than shown and described herein without departing from the intended scope of the disclosure. Further, it should be appreciated that the designation of left, right, front and rear are used descriptively for the figures, and do not represent limitations on the scope of the invention, as defined by the appended claims. The basic design and functionality of the eModules 40 is described in further detail below with reference to FIGS. 4-7. The vehicle 10 includes a central operating system 20 that includes a component control system 23 for each eModule 40, a primary master controller 50, and a secondary master controller 150. The component control system 23 is configured for controlling the eModules 40, via the primary and secondary master controllers 50, 150. The eModules 40, as with all components of the vehicle 10, may be driven solely via electrical power from a high-voltage energy storage system (ESS) 24 and an onboard battery management system (BMS) 52, shown in FIGS. 3, 6, and 7. Overall control supervision is provided via the primary master controller 50 and/or the secondary master controller 150, as shown in FIGS. 3, 6, and 7, and explained in more detail below.

Figure 6:
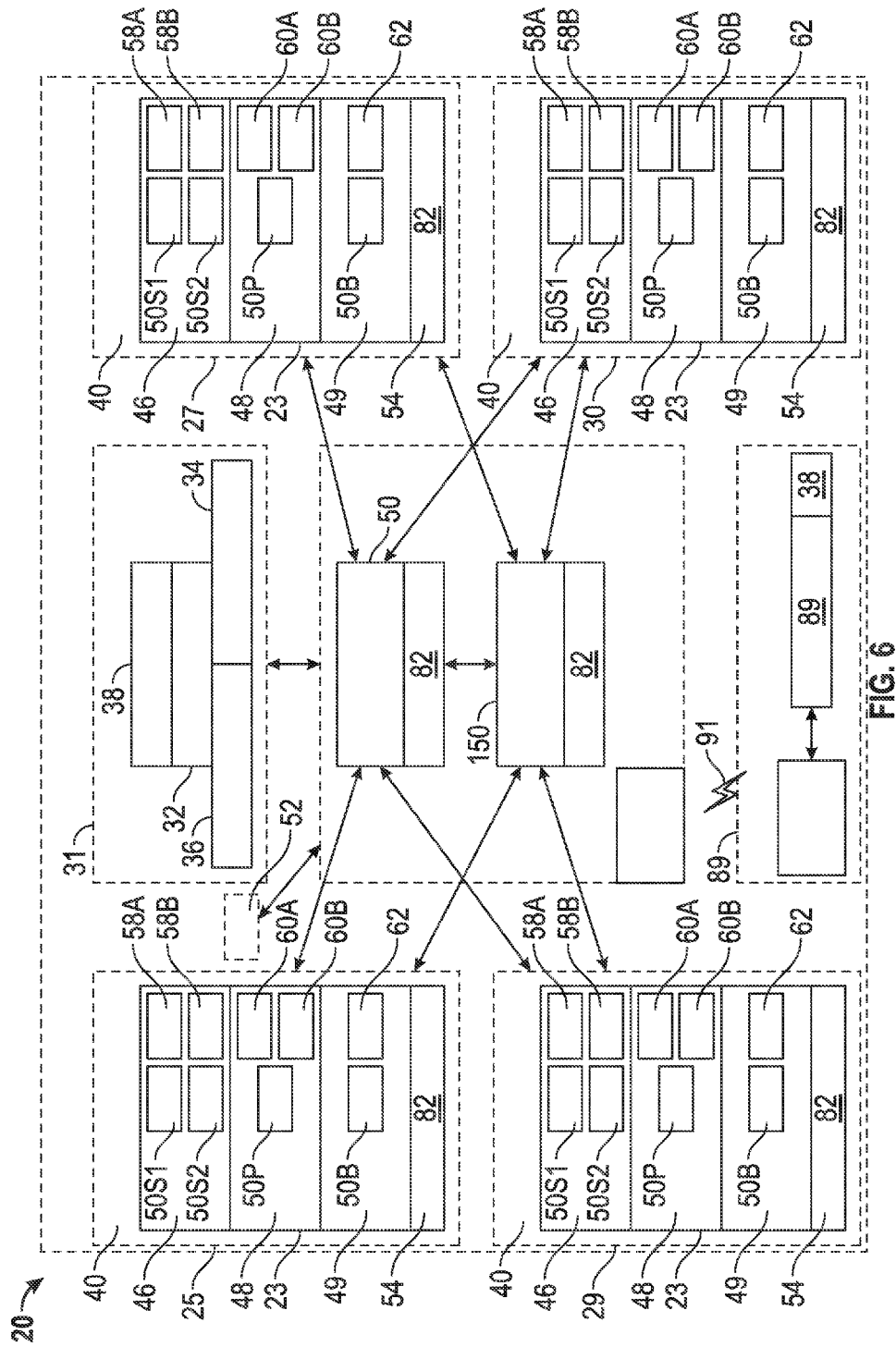
FIG. 6 is a schematic diagrammatic view of the functional controller architecture of the vehicle.

Referring to FIG. 6, the component control system 23 for each eModule 40 includes a steering module 46, a propulsion module 48, a braking module 49, and a communications module 54. As such, there is a component control system 23 embedded within the LF 25 eModule 40, the RF 27 eModule 40, the LR 29 eModule 40, and the RR 30 eModule 40.

Figure 4:
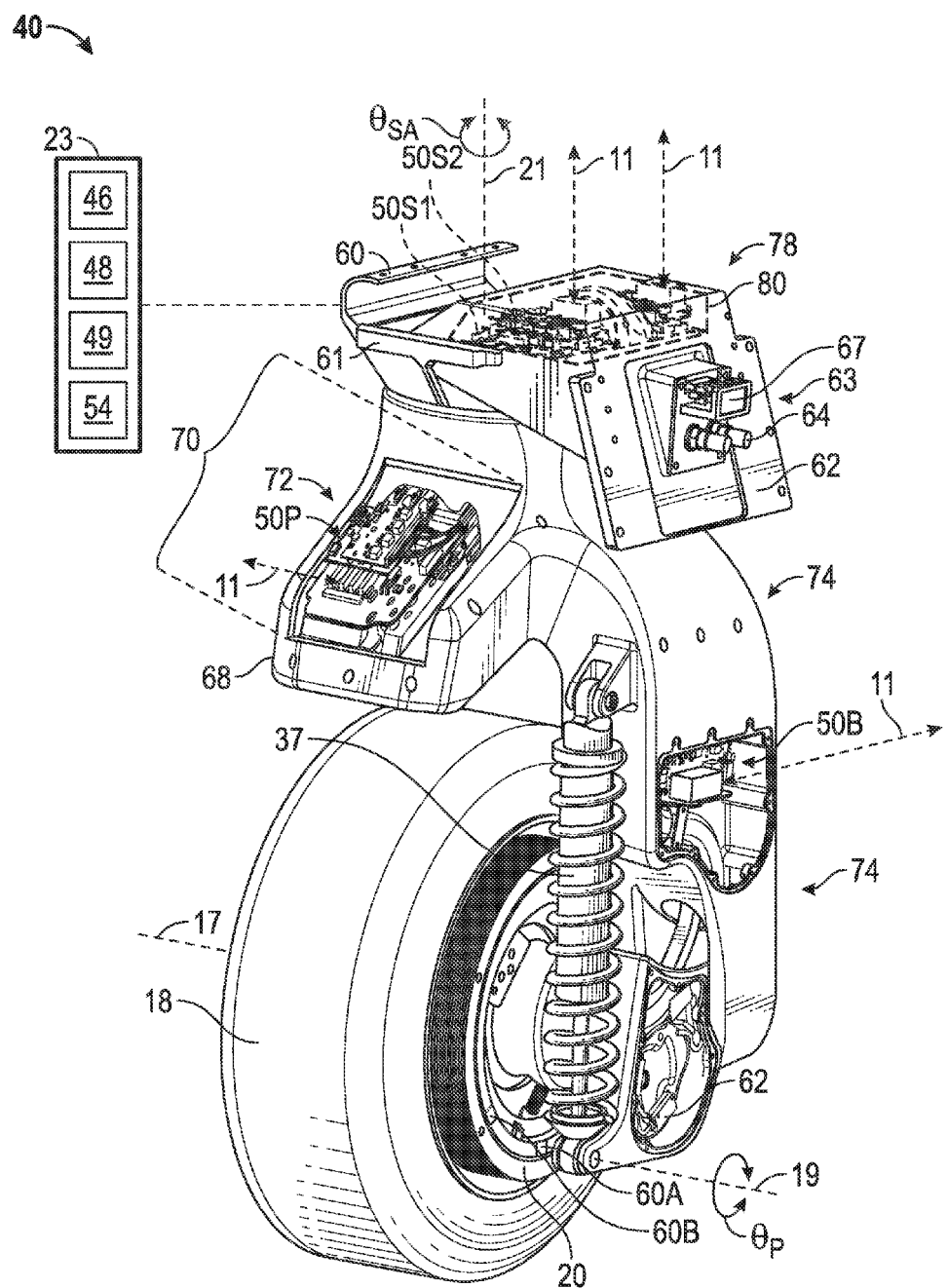
FIG. 4 is a schematic perspective side view illustration of an example modular eModule usable with the vehicle shown in FIGS. 1-3.

The steering module 46 is configured for directing steering of the eModule 40. The steering module 46 includes a first and a second steering controller 50S1, 50S2 and a first and second steering sensor 58A, 58B, i.e., encoder read head. Functional redundancy within the steering module 46 is enabled via the use of the first and second steering controllers 50S1, 50S2, as shown in FIGS. 4, 6, and 7. The first and second steering sensors 58A, 58B each redundantly measure and output the steering angle (arrow $\theta_{SA}$) to a corresponding one of the first and second steering controllers 50S1, 50S2. Therefore, each of these steering controllers 50S1, 50S2 receives the steering angle (arrow $\theta_{SA}$) from a corresponding one of the first and second steering sensors 58A, 58B, e.g., Hall effect sensors. The first and second steering controllers 50S1, 50S2 are explained in more detail below.

Referring to FIGS. 4 and 6, the propulsion module 48 is configured for directing propulsion of the eModule 40 and for determining wheel speed of the vehicle 10. The propulsion module 48 includes a propulsion controller 50P and a first and a second propulsion sensor 60A, 60B or encoder. The first and second propulsion sensors 60A, 60B, which are shown schematically in FIG. 4, provide rotational positional information of the respective wheel 18. The first and second propulsion sensors 60A, 60B may include any suitable sensor capable of providing rotational positional information.

Referring to FIGS. 4 and 6, the braking module 49 is configured for directing braking of the eModule. The braking module 49 includes a braking controller 50B and a braking sensor 62. The braking sensor 62 is shown schematically in FIG. 4. The braking controller 50B is used at each eModule 40 to independently control the respective braking at the various eModules 40. More specifically, with reference to FIG. 4, the braking sensor 62 may include, but not be limited to, an encoder disc and read head, which are operable to identify a rotational position of an output shaft (now shown) of a brake actuator (not shown). As such, the braking controller 50B controls the engagement and disengagement of brake shoes (not shown) within the eModule 40, through all levels of wear of the brake shoes. Accordingly, the brake system does not require any mechanisms for adjusting slack in the brake system caused by wear of the brake shoes.

The communications module 54 is configured for communicating between each of the primary and secondary master controllers 50, 150 and the corresponding steering, propulsion, and braking modules 46, 48, 49. The communications module 54 may employ an embedded network including, but not limited to, Ethernet for Control Automation Technology "EtherCAT" 82 for communicating between the primary and secondary master controllers 50, 150 and the corresponding steering, propulsion, and braking modules 49. EtherCAT 82 is an open high performance Ethernet-based fieldbus system that allows high data throughput. It should be appreciated, however, that other embedded networks may also be used, such as CAN Bus, FlexRay, MLVDS, and the like. Further, the EtherCAT 82 includes an Ethernet connection that is configured to communicate with Ethernet connections on each of the primary and secondary master controllers 50, 150, as illustrated in FIGS. 6 and 7.

Referring briefly to the functional hardware interface diagrams depicted in FIG. 7, the primary and secondary master controllers 50, 150 may be embodied as a microprocessor-based computer device having sufficient amounts of tangible, non-transitory memory, e.g., read only memory (ROM), as well as transitory memory such as random access memory (RAM), electrically-programmable read-only memory (EPROM), etc. The primary and secondary master controllers 50, 150 may also include logic circuitry including but not limited to proportional-integral-derivative (PID) control logic, a high-speed clock, analog-to-digital (A/D) circuitry, digital-to-analog (D/A) circuitry, digital signal processor hardware, and any necessary input/output (I/O) devices and other signal conditioning and/or buffer circuitry. Control functions described herein may be recorded in computer-readable formats in a location accessible by the primary and secondary master controllers 50, 150, and executed from such memory in response to changing driver inputs and other conditions such as vehicle speed, battery state of charge, and the like. Further, the primary and secondary master controllers 50, 150 may also be configured to include command/message handlers 77, EtherCAT drivers 75E, CAN drivers 75C, data distribution service (DDS) 75D, and the like.

The primary and secondary master controllers 50, 150 provide redundancy in transmitting commands to the eModules 40. The primary master controller 50 and the secondary master controller 150 are configured to be in direct operative communication with one another. More specifically, the primary and secondary master controllers 50, 150 are synchronized via controller area network "CAN" and input/output "IO" interfaces, shown respectively at 83 and 84 in FIG. 7, so that the primary and secondary master controllers 50, 150 simultaneously transmit commands to the component control system 23 of each eModule 40. Synchronization of the primary and secondary master controllers 50, 150 provides a priority scheme therebetween. As such, each steering, propulsion, and braking controller 50B disposed within each eModule 40 is configured to prefer commands from the primary master controller 50, if available. However, the EtherCAT 82 network provides built-in diagnostic features that allow the control architecture to switch command sources on-the-fly, while the system is operating, i.e., from the primary master controller 50 to the secondary master controller or vice versa. As such, each of the primary and master controllers 50, 150 include a fault detector 79 (e.g., a watchdog circuit) or through some other fault detection means. The component control systems 23 may be configured to only accept commands from the secondary master controller when a fault occurs in the primary master controller 50. Therefore, at the master controller level 50, 150, if a communication fault occurs, the computer software in the master controller may transition into a "degraded mode" and a maximum vehicle 10 speed may be reduced. This arbitration strategy is important because, in the event of a failure, no action is required on the part of the primary or secondary master controllers 50, 150 for the individual module 46, 48, 49 controllers 50S1, 50S2, 50B, 50P to continue functioning. This is important, because the response time of the system to a failure is typically fast, i.e., about 25 milliseconds (ms), and is thus suitable for controlling a vehicle driving at desired operational speeds.

With continued reference to FIG. 7, each of the component controllers 50S1, 50S2, 50P, 50B, i.e., steering, propulsion, and braking controllers, corresponding to the respective eModule 40, are in operative communication with each of the primary and secondary master controllers 50, 150 via an Ethernet connection 81. Further, the component controllers 50S1, 50S2, 50B, 50P for the LR 29 eModule 40 are in operative communication with the component controllers 50S1, 50S2, 50B, 50P for the RF 27 eModule 40 and the component controllers 50S1, 50S2, 50B, 50P for the LF 25 eModule 40 are in operative communication with the component controllers 50S1, 50S2, 50B, 50P for the RR 30 eModule 40 via a secondary Ethernet connection 81S. This operative communication between the component controllers 50S1, 50S2, 50B, 50P provides a daisy-chain ring topology using Ethernet hardware interfaces. Data packets originate from the primary and secondary master controllers 50, 150 and pass through each EtherCAT slave device 54 before returning back to the primary and secondary master controllers 50, 150. Because of the daisy, chain topology, a failure in any network link may prevent communication to the slave devices 54 downstream of the failure. To mitigate this, two physical Ethernet interfaces are used on the primary and secondary master controllers 50, 150 to enable communication to continue, given any single cable failure. Further, an additional EtherCAT ring network, with slaves in reverse order, is provided to maximize availability. This allows up to three EtherCAT network faults to occur and still maintain full control of the eModules 40.

Referring again to FIG. 1, the vehicle 10 of FIG. 1 also includes a chassis 12 to which is attached a front and a rear body shell 14 and 16, respectively. The chassis 12 may be formed from a lattice of interconnected tubular frame pieces, e.g., steel, aluminum, or fiberglass tubing. The structure of the chassis 12 can also be used to help secure the eModules 40 to the chassis 12.

Further with respect to FIG. 1, each drive wheel 18 is individually powered by the corresponding propulsion module 48 and braking module 49 contained within a hub 96 or center structure of the drive wheel 18. The propulsion module 48 is configured to propel the vehicle 10 by causing the corresponding wheel 18 to rotate about a wheel axis 17. More specifically, the propulsion controller 50P is configured to receive a command from the primary and/or secondary master controller 50, 150 and, in turn, send a signal to energize a corresponding electric wheel motor 85. While omitted from the Figures for added simplicity, each eModule 40 may include a brake assembly. The brake assembly may include a brake drum that may be used with a pair of diametrically-opposed brake shoes, each of which includes a friction surface that is operable to engage a radial inner surface of the brake drum. An electric brake motor, also omitted, may be used to move the brake shoes into engaged with the drum when braking is commanded by a driver of the vehicle 10.

The vehicle 10 may also include any necessary vehicle accessory features such as a headlamp 22, the ESS 24, seats 26, and an optional overhead bar 28 or other overhead support structure such as a canopy (not shown).

Referring to FIG. 2, the vehicle 10 is controlled via driver commands as received by multiple driver interface devices 31. These devices collectively determine a driver's desired control response, and in turn provide associated control signals to the primary master controller 50, which is shown schematically in FIG. 3, for the purpose of establishing reliable, fault-tolerant by-wire control of all steering, propulsion, and braking functions. The noted driver interface devices 31 may include a steering input device, shown here as a conventional steering wheel 32 and an optional joystick 132, an accelerator pedal 34, a brake pedal 36, a human-machine interface (HMI) screen 38, e.g., a touch screen, and a dashboard display device 88. Other driver interface devices may be envisioned without departing from the intended inventive scope. In some embodiments, the functions of the steering wheel 32 as well as that of the pedals 34 and 36 may be performed via the joystick 132. With reference to FIG. 7, the HMI screen 38 and the dashboard display device 88 may be in operative communication with each other and the primary and secondary master controllers 50, 150 via a CAN Bus 83.

The dashboard display device 88 may be configured to display operating characteristics of the vehicle 10 and/or to provide the operator with the ability to select a driving mode of the vehicle. The dashboard display device 88 may be a Murphy PowerView 750 and the like.

With continued reference to FIG. 7, it should be appreciated that the interface devices 31 are not limited to being disposed on the vehicle 10, but may reside external to the vehicle 10 on a remote console 89. The remote console 89 may include the HMI screen 38, the dashboard display device 88, and a DDS 75D. The remote console 89 is configured to communicate with a hub 96 of the central operating system 20 via a wireless Ethernet connection 91. In turn, the hub 96 is in operative communication with the first and second primary controllers 50, 150 via an Ethernet connection 81, as implemented by the respective DDS 75D. The remote console 89 may be in addition to, or a replacement for, the HMI screen 38 and the dashboard display device 88 resident within the vehicle 10.

Referring to FIG. 3, the vehicle 10 is shown in exploded view to illustrate some of the modules and associated components noted above. Sensors (not shown) may be positioned with respect to the accelerator and brake pedals 34 and 36, respectively, and used to measure the amount of travel and/or force as corresponding accelerator pedal signals ($A_X$) and brake pedal signals ($B_X$). Similarly, a steering angle sensor may be positioned with respect to the steering input device 32 and used to measure the steering angle ($\theta_S$). Calculated changes in the measured steering angle over time determine the steering rate ($\omega_S$). Other control inputs (arrow 11) from the HMI screen 38 such as a selected drive/steering mode and/or heating, ventilation, and air conditioning (HVAC) settings, etc., as well as the various signals $A_X$, $B_X$, $\theta_S$, and $\omega_S$, are communicated to the primary and secondary master controllers 50, 150, via a CAN Bus, which ultimately coordinates all control actions on board the vehicle 10. For functional redundancy, as described above, the secondary master controller 150 may be used in conjunction with the primary master controller 50, with the secondary master controller 150 receiving the same set of signals. As described above, in the event of an unexpected logic fault, for instance, the secondary master controller 150 can continue to provide the core control functionality of the vehicle 10.

The chassis 12 may define multiple cavities within which the various modules are received and stowed. For example, the ESS 24 may be inserted below a floor pan 35 into a battery cavity 13B. Other subsystems or modules may include a coolant pump 41 for circulating coolant from a coolant reservoir 45 to a radiator 43, and/or to each of the eModules 40 for cooling of motor components located therein, all of which may be housed beneath the front body shell 14.

With respect to propulsion of the vehicle 10 of FIGS. 1-3, all energy needed for this function is supplied by the ESS 24, which may be connected to an offboard power supply via a charging port 55 for rapid recharging of the ESS 24. Thus, the vehicle 10 of FIGS. 1-3 is a battery electric vehicle (BEV) controlled by-wire as noted above, with all available drive and steering modes being electric vehicle (EV) mode variants.

The ESS 24 may be constructed as a high-voltage, multi-cell DC energy storage device, for example a rechargeable solid-cell lithium ion battery having a voltage rating of about 300 VDC to 400 VDC, with 360 VDC being a typical high-voltage rating. In addition to the various cells and connectors of the DC battery, the ESS 24 may include power management circuitry and logic of the type used for balancing and managing the state of charge of the cells, thermal management components, and the like. The ESS 24 in turn may include the necessary solid state hardware for controlling and converting the flow of electrical power to and from the ESS 24 aboard the vehicle 10.

As is well understood in the art, such power electronics hardware typically includes a power switching module with multiple semiconductor switches, i.e., MOSFETs or IGBTs, for converting DC power from the ESS 24 to AC power suitable for driving the motors positioned within the eModules 40, and for performing the reverse AC to DC conversion as needed for charging the ESS 24. The BMS 52 may also include a voltage regulator, a DC-to-DC converter for providing auxiliary power aboard the vehicle 10, power conditioning/filtering hardware, and the like. The BMS 52 is in operative communication with the primary and secondary master controllers 50, 150, the HMI screen 38, and the dashboard display device 88, via the CAN Bus.

The central operating system 20 may also be connected to a thermal control system (TMS) 100 and a power distribution unit (PDU) 102 via a CAN Bus. The TMS 100 is configured to regulate the operating temperature of the controllers 50, 150. The PDU 102 is a device configured with multiple outputs, designed to distribute electric power to the first and second master controllers 50, 150. The ESS 24 also requires communication to the master controllers 50, 150.

Referring to FIG. 4, the eModule 40 is configured to house all of the embedded controllers used for control of that particular corner of the vehicle 10, i.e., the propulsion controller 50P, the steering controllers 50S1, 50S2, and the brake controller 50B. To serve this function, the eModule 40 is provided with a housing 68, having an upper portion 70 and a lower portion 74, with the controllers 50P, 50S1, 50S2, 50B disposed therein.

The first and second steering controllers 50S1, 50S2, positioned with respect to the upper portion 70, locally control the steering function of the respective eModule 40. As described above, the two steering controllers 50S1, 50S2 may be used for functional redundancy over all steering functions. While omitted for simplicity, the upper portion 70 may include a removable access cover which provides direct access to the steering controllers 50S1, 50S2. A suspension assembly having a spring and damper assembly 37 are housed within or connected to the lower portion 74, e.g., electronics, wiring, conduit, and encoders (not shown) as needed for measuring and communicating information pertaining to the orientation of the drive wheel 18 with respect to a pivot axis 19 (see FIG. 5). The steering and propulsion controllers 50S1, 50S2, and 50P, respectively, are in communication with the primary and secondary master controllers 50, 150, shown in FIGS. 1 and 3, and programmed and equipped to perform local tasks in response to instructions from the primary or secondary master controller 50, 150 of FIG. 3.

Figure 5:
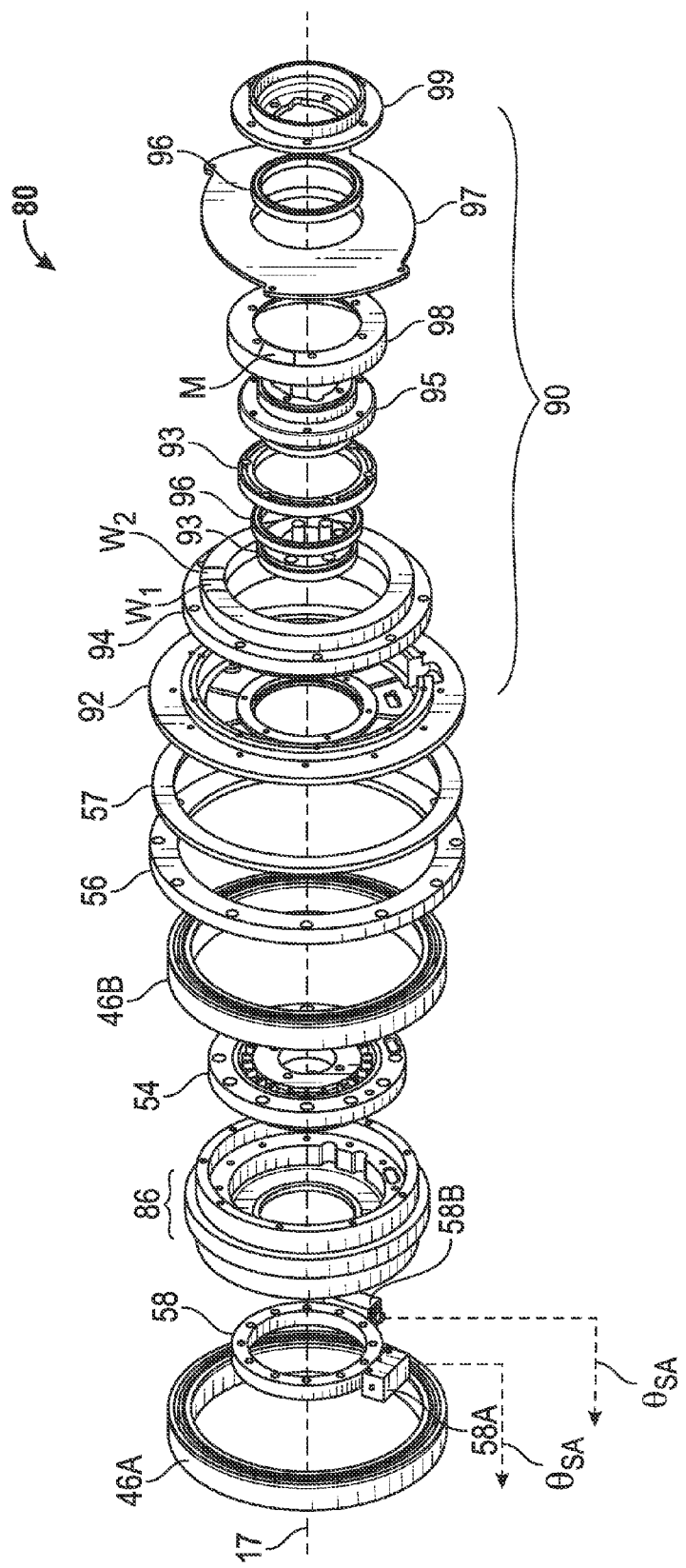
FIG. 5 is a schematic exploded perspective view of a steering module of the modular eModule.

Referring to FIG. 5, each eModule 40 includes a steering control assembly 80. Each steering control assembly 80 includes a series of annular components arranged along a steering axis 17. As viewed from left to right in FIG. 5, the steering control assembly 80 includes a plurality of sequentially stacked components that include a lower support bearing 146A, an encoder read disc 58, a steering hub 86, a speed reducing gear set 154, an upper support bearing 146B, a bearing clamp 156, a seal 157, and a steering motor stack 90. The encoder read disc 58 includes a first and a second steering sensor 58A, 58B, e.g., Hall effect sensors, each of which measures and outputs the steering angle (arrow $\theta_{SA}$) to a corresponding one of the steering controllers 50S1, 50S2 of FIG. 4. In one possible embodiment, the speed reducing gear set 154 shown in FIG. 5 provides a steering speed reduction ratio of at least 100:1, e.g., reducing a 2000 RPM steering input speed to a 20 RPM actual steering speed as transmitted to the drive wheel 18. This reduction in turn amplifies steering torque, as will be understood by those of ordinary skill in the art.

Still referring to FIG. 5, the upper support bearing 146B is disposed adjacent the speed reducing gear set 154, as shown. The bearing clamp 156 and seal 157 respectively maintain compression on the bearings 146A, 146B and provide a fluid seal within the steering control assembly 80, with the bearings 146A, 146B helping to support the load of the vehicle 10 of FIG. 1 at a given eModule 40.

The seal 157 shown in FIG. 5 seals against the steering motor stack 90. The steering motor stack 90 includes a motor support race 92 and a dual-wound stator 94 having two sets of windings W1 and W2, with only a portion of the windings W1 and W2 shown schematically for illustrative simplicity. The steering motor stack 90 may also include annular motor supports 93 and a pair of motor bearings 96. A motor hub 95 supports a rotor 98, on which are epoxied or otherwise secured a series of permanent magnets (M), only one of which is shown for clarity. The steering motor stack 90 is then secured together via a support plate 97 of aluminum or other suitable material and an outer race 99. Other embodiments of the various supporting elements shown in FIG. 5 may vary with the design. However, to provide functional redundancy to the steering function, the steering control assembly 80 should retain the design of the dual-wound stator 94 and the first and second steering sensors 58A, 58B.

Functional redundancy is enabled via the use of the two steering controllers 50S1, 50S2 shown in FIGS. 4-7. Each steering controller 50S1, 50S2 receives the measured steering angle (arrow $\theta_{SA}$) from a corresponding one of the steering sensors 58A, 58B. While the dual-wound stator 94 is shown schematically for illustrative clarity, those of ordinary skill in the art will understand that such a device has separately powered parallel windings W1, W2, and thus two poles. Therefore, the steering control assembly 80 of FIG. 5 has one physical steering motor with a single rotor, i.e., the rotor 98. Being a permanent magnet-type device, the rotor 98 should have a very low electrical and mechanical fault tendency. However, the dual-wound stator 94 is electrically energized, and thus the built-in functional redundancy allows the steering motor assembly 80 to function even in the presence of an electrical short or other fault in one of the windings W1 or W2.

That is, under steady state conditions the windings W1 and W2 of the dual-wound stator 94 may be energized via the ESS 24 of FIGS. 1 and 3, with each of the dual windings receiving 50% of the required steering power. Should one of the dual windings experience a fault, the primary and secondary master controllers 50, 150 of FIG. 3 can automatically discontinue power transmission to the faulted winding and increase power transmission to the non-faulted winding. While such a control action may result in additional heat generation, the resultant thermal management concerns may be tolerated in the short term to maintain a threshold level of steering functionality.

Referring again to FIG. 5, the first and second steering sensors 58A, 58B, and other associated hardware (not shown), for a given eModule 40 can be housed with the first and second steering controllers 50S1, 50S2, and configured to properly encode the position and rotational speed of a steering joint within the eModule 40, as well as to amplify steering torque from such a steering motor. As will be appreciated by those having ordinary skill in the art, such embedded controllers may include printed circuit board assemblies (PCBAs) having local task execution responsibility for the eModule 40 within which the PCBA is embedded with instructions received from the primary master controller 50. The various PCBAs embodying the individual embedded controllers 50P, 50B, 50S1, and 50S2 may include a microprocessor, tangible, non-transitory and transitory memory, transceivers, cooling plates, and the like, and programmed to perform specific tasks locally with respect to the eModule 40 in which the PCBA is embedded.

With reference to FIG. 4, the propulsion controller 50P may be contained within the upper portion 70 of the housing 68, thereby securing the propulsion controller 50P in proximity to the drive wheel 18 being controlled without subjecting the propulsion controller 50P to the forces typically experienced by the drive wheel 18 as the vehicle 10 travels along a road surface. The brake controller 50B may be positioned in the lower portion 74. Any or all of the various controllers 50, 150, 50B, 50S1, 50S2, 50P provide a level of functional redundancy. For instance, as discussed previously, redundant steering controllers 50S1, 50S2, provide back-up steering control functionality and the secondary master controller 150 provides back-up to the primary master controller 50 for reliable control of the vehicle 10, in the event the primary master controller 50 and/or one of the steering controllers 50S1, 50S2 should experience an unexpected transient logic error or other unexpected hardware or software fault.

With continued reference to FIG. 4, the three axes of the eModule 40 are represented as the wheel axis 17, pivot axis 19, and steering axis 21. The drive wheel 18 rotates with respect to the wheel axis 17 as noted above, while the mounted eModule 40 rotates through an actual steering angle range indicated by double-headed arrow $\theta_{SA}$. The driver wheel 18 is also allowed to pivot with respect to axis 19 to help absorb shock and road vibration.

Use of the modular, independently-controlled eModules 40 of FIG. 4 enables different steering or drive modes, including two-wheel, four-wheel, diamond, and omni-directional steering modes, as well as a park mode. Two-wheel and four-wheel steering enable steering via two or four of the eModules 40, respectively. Diamond steering is a particular four-wheel steering mode in which the drive wheels 18 are positioned such that a line passing through their respective centers all pass through a center point of the vehicle 10. Propulsion in this mode would cause the vehicle 10 to rotate in place around its vertical axis, as will be appreciated by one having ordinary skill in the art.

Omni-directional steering places all of the drive wheels 18 at the same angle with respect to the vehicles longitudinal axis, i.e., the lengthwise axis of the vehicle 10 as shown in FIGS. 1 and 2, such that the drive wheels 18 are all facing in the same direction. This enables a "crab mode" driving maneuver wherein the vehicle 10 can move at an angle with respect to its longitudinal axis, including at right angles. Such a mode might facilitate difficult parking maneuvers, particularly parallel parking into a tight parking space. Park mode places the front and rear wheels located on the same side of the vehicle, such the front and rear right side, are at the same angle. Thus, in park mode the two front wheels and the two rear wheels would point outward with respect to the longitudinal axis of the vehicle 10, thereby preventing any forward or reverse motion.

As noted above, the primary and secondary master controllers 50, 150 are programmed to execute a wide spectrum of different steering modes, including the two-wheel, four-wheel, diamond, and omni-directional or "crab mode" steering noted above. The modular design of the eModules 40, along with the distributed control network with the primary and secondary master controllers 50, 150 at its center, enables such flexibility. A driver, using the HMI screen 38 of FIG. 3 or other suitable input device such as a mode selector switch, can pick the steering maneuver for a given drive situation.

Using the vehicle 10 of FIGS. 1-3, independent drive-by-wire control is enabled over multiple steering, propulsion, and braking modules 46, 48, 49, all of which are housed within a corresponding modular eModule 40. The primary or secondary master controllers 50, 150 of FIG. 3 supervise the control of each eModule 40, and combines the eModules 40 into a cohesive system. Full control authority by the primary or secondary master controller 50, 150 over the functions of each eModule 40 enhances the overall maneuverability of the vehicle 10.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A central operating system comprising:
   a first component control system configured for controlling a first electric steering, propulsion, braking, and suspension subsystem component (eModule);
   a second component control system configured for controlling a second eModule;
   a third component control system configured for controlling a third eModule; and
   a fourth component control system configured for controlling a fourth eModule;
   a primary master controller in operative communication with each of the first, second, third, and fourth component control systems; and
   a secondary master controller in operative communication with each of the first, second, third, and fourth component control systems;
   wherein each of the first, second, third, and fourth component control systems includes at least one of:
   a steering module configured for directing steering of the respective modular component, wherein the steering module includes:

a first and second steering controller; and
a first and second steering sensor;
a propulsion module configured for directing propulsion of the respective modular component, wherein the propulsion module includes:
a propulsion controller; and
a first and second propulsion sensor;
a braking module configured for directing braking of the respective modular component, wherein the braking module includes a braking controller; and
a communications module operatively connected to each of the steering module, the propulsion module, and the braking module, wherein the communications module is configured for communicating with the primary and secondary controller;
wherein the primary master controller and the secondary master controller are configured to simultaneously transmit commands to at least one of the first, second, third, and fourth component control systems; and
wherein the first, second, third, and fourth component control systems are each configured to accept commands from the secondary master controller only when a fault occurs in the primary master controller.

2. A central operating system, as set forth in claim 1, wherein at least one of the first and second steering controllers, the propulsion controller, and the braking controller of each eModule are in operative communication with each of the primary and secondary master controllers via an Ethernet connection;
wherein at least one of the first and second steering controllers, the propulsion controller, and the braking controller of the third eModule are in operative communication with at least one of the first and second steering controller, the propulsion controller, and the braking controller of the second eModule via a secondary Ethernet connection to provide redundancy in the event the operative communication between the at least one of the first and second steering controllers, the propulsion controller, and the braking controller of each eModule and each of the primary and secondary master controllers via the Ethernet connection is interrupted; and
wherein the at least one of the first and second steering controllers, the propulsion controller, and the braking controller of the first eModule are in operative communication with each of the first and second steering controller, the propulsion controller, and the braking controller of the fourth eModule to provide redundancy via another secondary Ethernet connection to provide redundancy in the event the operative communication between the at least one of the first and second steering controllers, the propulsion controller, and the braking controller of each eModule and each of the primary and secondary master controllers via the Ethernet connection is interrupted.

3. A central operating system, as set forth in claim 1, further comprising a battery management system (BMS) in operative communication with each of the primary and secondary controllers;
wherein the BMS is configured to control charging of a battery.

4. A central operating system, as set forth in claim 1, further comprising at least one of a thermal control system and a power distribution unit (PDU) in operative communication with each of the primary and secondary controllers;
wherein the PDU is configured to distribute electric power to the first and second master controllers.

5. A central operating system, as set forth in claim 1, further comprising a driver interface device in operative communication with each of the first and second primary controllers;
wherein driver interface device is configured to determine a driver's desired control response and provide an associated control signal to the primary and secondary master controllers.

6. A central operating system, as set forth in claim 5, wherein the driver interface device includes at least one of a human machine interface (HMI) device, a steering wheel, and a brake pedal.

7. A central operating system, as set forth in claim 6, further comprising a remote console disposed external to the vehicle and in operative communication with the primary and secondary master controllers;
wherein the remote console includes the driver interface device.

8. A central operating system, as set forth in claim 7, wherein the driver interface device includes a dashboard display device;
wherein the dashboard display device is configured to receive inputs from at least one of the primary and secondary controllers and to provide a display of operational information as a function of the received inputs.

9. A vehicle comprising:
a chassis;
a first, second, third, and fourth electric steering, propulsion, braking, and suspension subsystem (eModule) supported by the chassis; and
a central operating system including:
a first component control system configured for controlling the first eModule;
a second component control system configured for controlling the second eModule;
a third component control system configured for controlling the third eModule; and
a fourth component control system configured for controlling the fourth eModule;
wherein each of the first, second, third, and fourth component control systems include at least one of:
a steering module configured for directing steering of the respective modular component, wherein the steering module includes:
a first and second steering controller; and
a first and second steering sensor;
a propulsion module configured for directing propulsion of the respective modular component, wherein the propulsion module includes a first and second propulsion sensor;
a braking module configured for directing braking of the respective modular component; and
a communications module operatively connected to each of the steering module, the propulsion module, and the braking module, wherein the communications module is configured for communicating with the primary and secondary controller;
a primary master controller in operative communication with each of the component control systems; and
a secondary master controller in operative communication with each of the component control systems;
wherein the primary master controller and the secondary master controller are configured to simultaneously transmit commands to the component control systems; and
wherein the component control systems are each configured to accept commands from the secondary master controller only when a fault occurs in the primary master controller.

10. A central operating system, as set forth in claim 9, further comprising an interface in operative communication with each of the primary and secondary controllers;
wherein the interface is configured to receive and input from an operator and supply the input to each of the primary and secondary controllers.

11. A central operating system comprising:
a first component control system configured for controlling a first electric steering, propulsion, braking, and suspension subsystem component (eModule);
a second component control system configured for controlling a second eModule;
a third component control system configured for controlling a third eModule; and
a fourth component control system configured for controlling a fourth eModule;
wherein each of the first, second, third, and fourth component control systems include:
a steering module configured for directing steering of the respective eModule;
a propulsion module configured for directing propulsion of the respective eModule; and
a braking module configured for directing braking of the respective eModule;
a primary master controller in operative communication with each of the first, second, third, and fourth component control system; and
a secondary master controller in operative communication with each of the first, second, third, and fourth component control system;
wherein the primary master controller and the secondary master controller are configured to simultaneously transmit commands to each of the first, second, third, and fourth component control system;
wherein each of the first, second, third, and fourth component control systems are configured to accept commands from the secondary master controller only when a fault occurs in the primary master controller.

12. A central operating system, as set forth in claim 11, wherein the steering module includes:
a first and a second steering controller; and
a first and a second steering sensor.

13. A central operating system, as set forth in claim 12, wherein the propulsion module includes:
a propulsion controller; and
a first and second propulsion sensor.

14. A central operating system, as set forth in claim 13, wherein the braking module includes a braking controller.

15. A central operating system, as set forth in claim 14, wherein at least one of the first and second steering controllers, the propulsion controller, and the braking controller of each eModule are in operative communication with each of the primary and secondary master controllers via an Ethernet connection;
wherein at least one of the first and second steering controllers, the propulsion controller, and the braking controller of the third eModule are in operative communication with at least one of the first and second steering controller, the propulsion controller, and the braking controller of the second eModule via a secondary Ethernet connection to provide redundancy in the event the operative communication between the at least one of the first and second steering controllers, the propulsion controller, and the braking controller of each eModule and each of the primary and secondary master controllers via the Ethernet connection is interrupted; and
wherein the at least one of the first and second steering controllers, the propulsion controller, and the braking controller of the first eModule are in operative communication with each of the first and second steering controller, the propulsion controller, and the braking controller of the fourth eModule to provide redundancy via another secondary Ethernet connection to provide redundancy in the event the operative communication between the at least one of the first and second steering controllers, the propulsion controller, and the braking controller of each eModule and each of the primary and secondary master controllers via the Ethernet connection is interrupted.

16. A central operating system, as set forth in claim 11, wherein each of the first, second, third, and fourth component control systems include a communications module is configured for communicating with the primary and secondary controller.

17. A central operating system, as set forth in claim 11, further comprising a battery management system (BMS) in operative communication with each of the primary and secondary controllers;
wherein the BMS is configured to control charging of a battery.

18. A central operating system, as set forth in claim 11, further comprising at least one of a thermal control system and a power distribution unit (PDU) in operative communication with each of the primary and secondary controllers;
wherein the PDU is configured to distribute electric power to the first and second master controllers.

19. A central operating system, as set forth in claim 11, further comprising a driver interface device in operative communication with each of the first and second primary controllers;
wherein the driver interface device includes at least one of a human machine interface (HMI) device, a steering wheel, and a brake pedal; and
wherein driver interface device is configured to determine a driver's desired control response and provide an associated control signal to the primary and secondary master controllers.

20. A central operating system, as set forth in claim 19, further comprising a remote console disposed external to the vehicle and in operative communication with the primary and secondary master controllers;
wherein the remote console includes the driver interface device.

* * * * *